(12) United States Patent
Birkel et al.

(10) Patent No.: US 12,227,422 B2
(45) Date of Patent: Feb. 18, 2025

(54) SOL-GEL SYNTHESIS OF MAX PHASE FUNCTIONAL MATERIALS

(71) Applicants: Christina S. Birkel, Tempe, AZ (US); Jan P. Siebert, Tempe, AZ (US)

(72) Inventors: Christina S. Birkel, Tempe, AZ (US); Jan P. Siebert, Tempe, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 218 days.

(21) Appl. No.: 17/814,095

(22) Filed: Jul. 21, 2022

(65) Prior Publication Data

US 2023/0037291 A1   Feb. 9, 2023

Related U.S. Application Data

(60) Provisional application No. 63/225,845, filed on Jul. 26, 2021, provisional application No. 63/225,127, filed on Jul. 23, 2021, provisional application No. 63/225,121, filed on Jul. 23, 2021.

(51) Int. Cl.
| | |
|---|---|
| *C01B 32/907* | (2017.01) |
| *B29C 39/00* | (2006.01) |
| *B29C 39/38* | (2006.01) |
| *C01B 21/06* | (2006.01) |
| *B29K 105/00* | (2006.01) |
| *B29L 7/00* | (2006.01) |

(52) U.S. Cl.
CPC .......... *C01B 32/907* (2017.08); *B29C 39/003* (2013.01); *B29C 39/38* (2013.01); *C01B 21/0602* (2013.01); *B29K 2005/00* (2013.01); *B29K 2105/0061* (2013.01); *B29L 2007/008* (2013.01); *C01P 2004/03* (2013.01); *C01P 2004/04* (2013.01); *C01P 2004/32* (2013.01); *C01P 2004/61* (2013.01)

(58) Field of Classification Search
CPC .............. C01B 32/907; C01B 21/0602; B29C 39/003; B29C 39/38
USPC ......................................................... 428/220
See application file for complete search history.

(56) References Cited

U.S. PATENT DOCUMENTS

2020/0303736 A1* 9/2020 Barsoum ................. C30B 29/60

OTHER PUBLICATIONS

Sibert, et. al.; "Sol-gel based synthesis and enhanced processability of MAX phase Cr2GaC"; Apr. 15, 2019; Journal of Materials Chemistry C; whole document (Year: 2019).*
Haemers et al.; Synthesis Protocols of the Most Common Layered Carbide and Nitride MAX Phases; 2020; Small Methods, 4, 1900780, whole document (Year: 2020).*

(Continued)

*Primary Examiner* — Tahseen Khan
(74) *Attorney, Agent, or Firm* — Fish & Richardson P.C.

(57) ABSTRACT

Preparing MAX phase structures includes forming a gel including a transition metal M, a Group 3A or Group 4A metal or semimetal A, and an acidic chelating agent or gelling agent X. X includes one or both of carbon and nitrogen. Preparing the MAX phase structures further includes shaping the gel to yield a shaped gel and heating the shaped gel to yield carbonaceous MAX phase structures with a composition represented by $M_{n+1}AX_n$, wherein n is 1, 2, 3, or 4. The MAX phase structures can be thick films, microspheres, or microwires.

21 Claims, 11 Drawing Sheets

(56) References Cited

OTHER PUBLICATIONS

Akhlaghi et al., "Self-propagating high-temperature synthesis of Ti3AlC2 MAX phase from mechanically-activated Ti/Al/graphite powder mixture," Ceram. Int., 2018, 44:9671-9678.
Barsoum, "The MN+1AXN Phases: A New Class of Solids; Thermodynamically Stable Nanolaminates," Prog. Solid State Chem., 2000, 28:201-281.
Boston et al., "Synthesis of spherical superconductors," CrystEngComm, 2013, 15:3763-3766.
Chen et al., "3D printing of ceramics: A review," Journal of the European Ceramic Society, Apr. 2019, 39(4):661-687.
Coelho, "TOPAS and TOPAS-Academic: an optimization program integrating computer algebra and crystallographic objects written in C++," J. Appl. Crystallogr., 2018, 51:210-218.
Dorey et al., "Electroceramic thick film fabrication for Mems," J. Electroceramics, 2004, 12:19-32.
Gecim et al., "Processing and applications of ceramic microspheres," Advanced Welding and Deforming, 2021, 32 pages.
Haemers et al., "Synthesis Protocols of the Most Common Layered Carbide and Nitride MAX Phases," Small Methods, 2020, 4:1900780, 32 pages.
Hogberg et al., "Growth and characterization of MAX-phase thin films," Surf. Coatings Technol., 2005, 193:6-10.
Hu et al., "Fabrication and application of inorganic hollow spheres," Chem. Soc. Rev., 2011, 40:5472-5491.
Kiener et al., "Carbide, nitride and sulfide transition metal-based macrospheres," J. Eur. Ceram. Soc., 2017, 37:1127-1130.
Lapauw et al., "Rapid synthesis and elastic properties of fine-grained Ti2SnC produced by spark plasma sintering," J. Alloys Compd., 2015, 631:72-76.
Naguib et al., "25th anniversary article: MXenes: A new family of two-dimensional materials," Adv. Mater., 2014, 26:992-1005.
Naguib et al., "Two-Dimensional Nanocrystals Produced by Exfoliation of Ti3AlC2," Adv. Mater., 2011, 23:4248-4253.
Rinaudo, "Chitin and chitosan: Properties and applications," Prog. Polym. Sci., 2006, 31:603-632.
Rundqvist et al., "Crystal structure refinement of Cr3C2," Acta Chem. Scand., 1969, 23:1191-1199.
Schuster et al., "The ternary systems: Cr—Al—C, V—Al—C, and Ti—Al—C and the behavior of H-phases (M2AlC)," J. Solid State Chem., 1980, 32:213-219.
Siebert et al., "Sol-gel based synthesis and enhanced processability of MAX phase Cr2GaC," J. Mater. Chem. C, 2019, 7:6034-6040.
Siebert et al., "The synthesis and electrical transport properties of carbon/Cr2GaC MAX phase composite microwires," Nanoscale, 2022, 14:744-751.
Sokol et al., "On the Chemical Diversity of the MAX Phases," Trends Chem., 2019, 1(2):210-223.

\* cited by examiner

SOL-GEL SYNTHESIS OF MAX PHASE FUNCTIONAL MATERIALS

CROSS-REFERENCE TO RELATED APPLICATIONS

This application claims the benefit of U.S. Patent Application Nos. 63/225,121 and 63/225,127, filed Jul. 23, 2021, and 63/225,845, filed Jul. 26, 2021, all of which are incorporated herein by reference in their entirety.

TECHNICAL FIELD

This disclosure relates to sol-gel synthesis of MAX phase structures, including microwires, thick films, and microspheres, and the resulting microstructures.

BACKGROUND

MAX phase materials have ceramic (e.g., high temperature/fatigue resistant, damage tolerant) and metallic properties (electrically and thermally conductive) and can be used, for example, as coatings for materials (e.g., electronics) used under extreme conditions. MAX phase materials generally have a composition represented by $M_{n+1}AX_n$, where M is a transition metal, A is an A group (typically IIIA and IVA) element, X is one or both of carbon and nitrogen, and n is 1, 2, 3, or 4. MAX phase materials have been synthesized by solid state methods, such as hot isostatic pressing, spark plasma sintering, or simple high temperature furnace syntheses.

SUMMARY

This disclosure generally relates to sol-gel synthesis of MAX phase structures (e.g., $Cr_2GaC$) and the resulting functional materials. The synthesis process utilizes metal ion sequestering properties of linear polysaccharides (e.g., chitosan) and crosslinked polysaccharides (e.g., CM-SEPHADEX). The resulting gel can be shaped into micron-sized microwires, thick films, and microspheres (including hollow microspheres) with tunable diameter and porosity. The MAX phase microwires can be synthesized with tunable electrical conductivity by doping with halogen gas. Advantages of the sol-gel synthesis formation of carbonaceous MAX phase functional materials include versatility and processability that allows shape control of the materials without post-synthesis machining.

Some applications of MAX phase microwires include conductive, flexible microwires for high temperature applications and harsh environments. In one example, the microwires can be used to fabricate thin and partially transparent grids for optoelectronic devices. In another example, the microwires can be used as chemiresistive halogen gas sensors.

Applications of MAX phase thick films include conductive thick films for micro-electromechanical systems. Applications of MAX phase microspheres range from fillers and cement additives to biomedical applications. Applications of MAX phase hollow microspheres range from drug delivery to the nuclear industry. This disclosure generally relates to sol-gel synthesis of MAX phase microstructures (e.g., microwires) and the resulting microstructures.

In a first general aspect, making MAX phase structures includes forming a gel including a transition metal M, a Group 3A or Group 4A metal or semimetal A, and an acidic chelating agent or gelling agent including X. X includes one or both of carbon and nitrogen. The first general aspect further includes shaping the gel to yield a shaped gel and heating the shaped gel to yield MAX phase structures with a composition represented by $M_{n+1}AX_n$, wherein n is 1, 2, 3, or 4.

Implementation of the first general aspect can include one or more of the following features.

In some cases, forming the gel includes dissolving a first salt or alkoxide including the transition metal M and a second salt or alkoxide including the Group 3A or Group 4A metal or semimetal A in a solvent to yield a sol, and combining the acidic chelating or gel forming agent with the sol to yield the gel. In some implementations, shaping the gel includes casting a portion of the gel into a mold and drying the portion to yield the shaped gel. The shaped gel can include a thick film precursor. In some implementations, heating the shaped gel includes heating the thick film precursor to yield the MAX phase structures. The MAX phase structures can include MAX a phase thick film with a thickness in a range of 1 μm to 50 μm. In certain cases, shaping the gel includes dispensing the gel into an alkaline solution, precipitating the gel to yield precipitated structures, removing the precipitated structures from the alkaline solution, and drying the precipitated structures to yield the shaped gel. The shaped gel can include microsphere precursors. In some implementations, shaping the gel includes heating the microsphere precursors to yield the MAX phase structures. The MAX phase structures can include MAX phase microspheres with a diameter in a range of 1 μm to 1000 μm or 500 μm to 700 μm. In some cases, shaping the gel includes forming a multiplicity of microwires from the gel, and heating the shaped gel yields a multiplicity of MAX phase nanowires. In certain implementations, shaping the gel includes spreading the gel between a first substrate and a second substrate, and separating the first substrate and the second substrate to yield the multiplicity of microwires. Shaping the gel can include spinning the gel to yield a multiplicity of microwires. In some cases, the chelating agent or gelling agent includes a polysaccharide. In certain implementations, the polysaccharide includes a linear polysaccharide, and the MAX phase structures include thick films, microspheres, or microwires. The microspheres can be porous. In some cases, the linear polysaccharide includes chitosan. In certain implementations, the polysaccharide includes a crosslinked polysaccharide, and the MAX phase structures include hollow microspheres. The crosslinked polysaccharide can include dextran. In some cases, M is chromium, A is gallium, and X is carbon or carbonitride.

In a second general aspect, a MAX phase structure includes a thick film, microsphere, or microwire having a composition represented by $M_{n+1}AX_n$. M is a transition metal, A is a Group 3A or Group 4A metal or semimetal A, X includes one or both of carbon and nitrogen, and n is 1, 2, 3, or 4.

Implementation of the second general aspect can include one or more of the following features.

In some cases, a thickness of the thick film is in a range of 1 μm to 50 μm. The microsphere can be porous or nonporous. In certain implementations, the microsphere has a diameter in a range of 1 μm to 1000 μm. In some implementations, M is chromium, A is gallium, and X is carbon, nitrogen, or carbonitride.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 3C is an SEM micrograph showing the surface morphology of the microwave-derived microwires, including hexagonally shaped particles. FIG. 3D is an SEM micrograph of an example of a Ga segregation on the microwire surface.

DETAILED DESCRIPTION

This disclosure relates to sol-gel synthesis of MAX phase structures, including microwires, thick films, and microspheres, and the resulting microstructures. MAX phase structures are synthesized by forming a gel that includes a transition metal M, a Group 3A or Group 4A metal or semimetal A, and a chelating or gel forming agent. In one example, M is chromium and A is gallium. The chelating or gel forming agent includes X, where X is one or both of carbon and nitrogen. The chelating or gel forming agent is a polysaccharide (e.g., a crosslinked polysaccharide). One example of suitable polysaccharide is dextran.

The gel is typically formed by dissolving a first salt or alkoxide including the transition metal M and a second salt or alkoxide including the Group 3A or Group 4A metal or semimetal A in a solvent to yield a sol, and combining the chelating or gel forming agent with the sol to yield the gel. Suitable solvents include water and organic solvents. Examples of organic solvents include alcohols (e.g., ethanol) and alkanes (e.g., hexanes). In some examples, the first salt and the second salt are independently nitrates or sulfates. In some examples, the first salt and the second salt are independently methoxides, ethoxides, propoxides, and butoxides. In some cases, the chelating or gel forming agent may be dissolved in an acidic solution. Suitable acids include weak acids and dilute strong acids, such as organic carboxylic acids (e.g., acetic acid) or dilute strong acids (e.g., hydrochloric acid). The gel is shaped to yield a shaped gel, and the shaped gel is heated to yield MAX phase structures with a composition represented by $M_{n+1}AX_n$, where n is 1, 2, 3, or 4.

Figure 1:
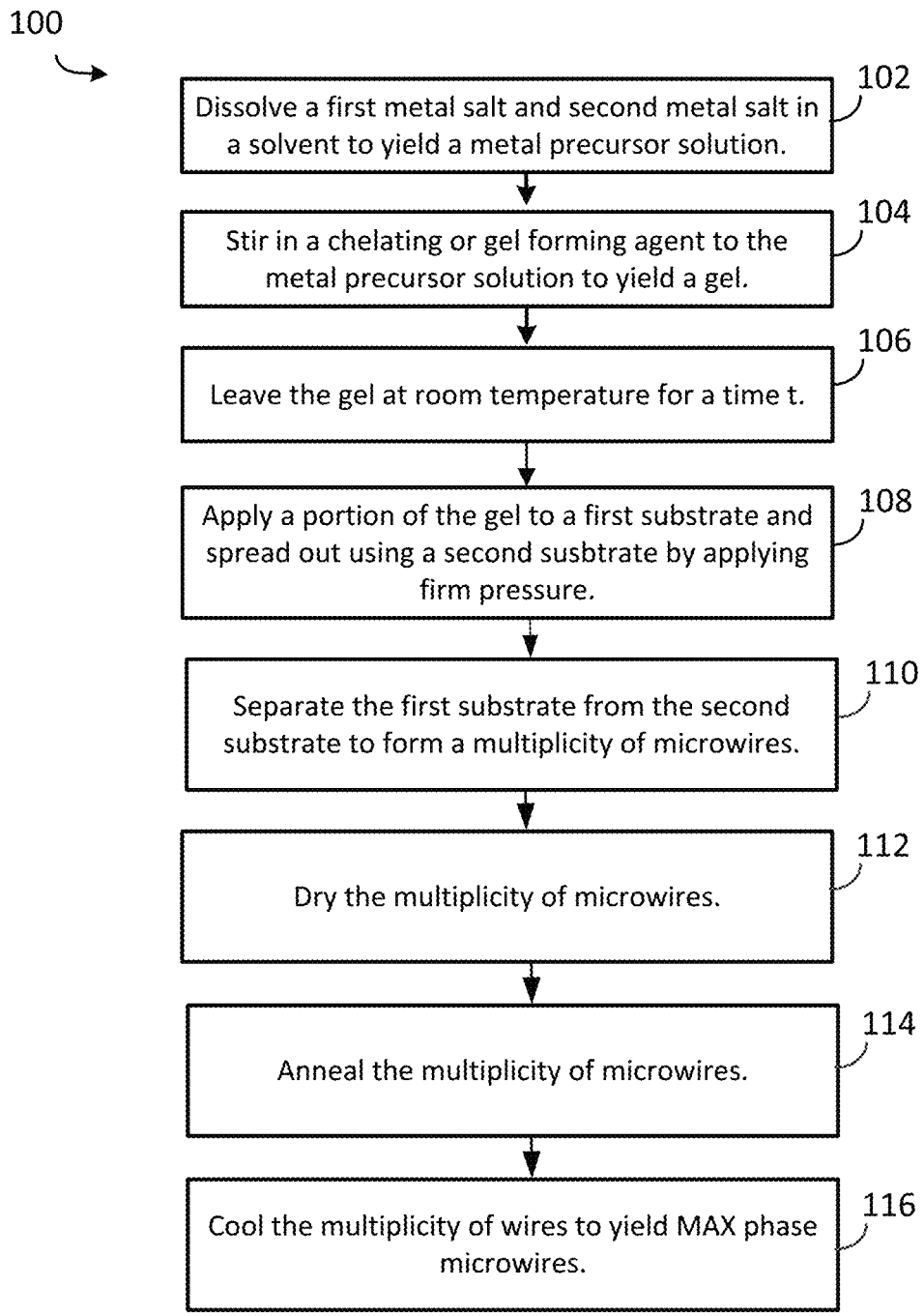
FIG. 1 is a flow chart showing the steps in a process to make MAX phase microwires.

In one embodiment, the MAX phase structures include a multiplicity of microwires formed from the gel. FIG. 1 is a flow chart showing operations in process 100 for synthesizing MAX phase microwires. In 102, a first metal salt and a second metal salt are dissolved in a solvent to yield a metal precursor solution. In 104, a chelating or gel forming agent is added to the metal precursor solution and stirred to form a gel. In 106, the gel is left at room temperature for a time t (e.g., 15-20 hours). After a time t, a portion of the gel is applied to a first substrate (e.g., a first glass plate). In 108, the portion of gel is spread out using a second substrate (e.g., a second glass plate) by applying firm pressure. In 110, the first substrate is separated from the second substrate to form a multiplicity of microwires between the first substrate and the second substrate. Depending on the amount of gel applied to the substrate, the microwires can be pulled to lengths of greater than 1 meter. In 112 and 114, microwires are dried and annealed, respectively. In 116, the annealed microwires are cooled to yield a multiplicity of MAX phase microwires.

In some cases, heating the multiplicity of microwires includes drying the microwires (112) followed by annealing the microwires (114). Drying the microwires (112) can include heating the microwires to a temperature of 100° C. for 1 hour to 24 hours. Annealing the microwires (114) can include heating the microwires in a furnace (e.g., a tube furnace) under flowing argon with a heating rate of 2° C./min to a temperature greater than 1000° C. Annealing the microwires (114) can include heating the microwires using microwaves, with a flow of argon into the reaction chamber during the heating process. In some cases, a quartz tube is used to guide argon into the reaction through an opening in the top of the microwave housing.

In one example, wires combusted in the setup were placed in an alumina tube, which was evacuated and flushed with argon three times, embedded in 7 g of graphite granules (activated charcoal, DARCO, 12-20 mesh, Honeywell) in the insulation housing (alumina fiber boards, Skyline Components LLC), and flushed for 15 minutes prior to heating it under flowing Ar (0.25 LPM). The microwave (Mars 6, CEM Corporation) was set to 700 W and was run for 20 minutes.

The microwires have a composition represented by $M_{n+1}AX_n$, where M is a transition metal, A is a Group 3A or Group 4A metal or semimetal A, and X is one or both of carbon and nitrogen. In one example, M is chromium, A is gallium, X is carbon, and the MAX phase is represented by $Cr_2GaC$. In other examples, the MAX phase microwires are nitrides or carbonitrides. The MAX phase microwires typically have a length in a range between about 1 mm and about 1 m and a diameter in a range between 200 nm and 50 μm.

Doping with species derived from halogen gas can change the electronic properties of the MAX phase microwires. Species derived from halogens (e.g., iodine and bromine) can be introduced into the layered structure of the MAX phase microwires by contacting the microwires with halogen gas in a temperature range of between 130° C. and 200° C. Time-resolved measurements revealed an increase in conductivity of the halide-doped microwires of more than 200%, as well as a time-dependent decrease of the conductivity increase. The sensitivity of the conductivity of MAX phase $Cr_2GaC$ microwires to halogen gas exposure indicates that they can be used as chemiresistive halogen gas sensors.

In another embodiment, the MAX phase structures include MAX phase thick films. When the MAX phase structures include MAX phase thick films, shaping the gel includes casting a portion of the gel into a mold and drying the portion to yield the shaped gel. The gel is defined as a thick film precursor. The thick film precursor is heated to yield the MAX phase structures in the form of MAX phase thick films. The MAX phase thick films typically have a thickness in a range of 1 µm to 50 µm.

In another embodiment, the MAX phase structures include MAX phase microspheres. The microspheres can be essentially nonporous, porous, or hollow. Nonporous microspheres can be prepared by using a linear polysaccharide (e.g., chitosan) as a chelating or gelling agent. Hollow or porous microspheres can be prepared by using a crosslinked polysaccharide (e.g., dextran). When the MAX phase structures include MAX phase microspheres, shaping the gel includes dispensing the acidic gel (e.g., with a pipette or similar dispenser) into an alkaline gel (e.g., 1 M NaOH) to precipitate the gel. The precipitated gel is referred to as precipitated structures. The precipitated structures are removed from the alkaline solution and dried to yield the shaped gel. The shaped gel is in the form of microspheres precursors. The microsphere precursors are heated to yield the MAX phase structures in the form of MAX phase microspheres with a diameter in a range of 1 µm to 1000 µm (e.g., 500 µm to 700 µm). The diameter is determined at least in part by the diameter of the opening through which the gel is dispensed.

Drying the shaped gel can include heating the shaped gel to a temperature of 100° C. for 1 hour to 24 hours. Heating the shaped gel results in the MAX phase structures. Heating the shaped gel can include calcining the microwires in a furnace (e.g., a tube furnace) or a microwave reactor to a temperature greater than 1000° C.

EXAMPLES

Microwires

Carbonaceous microwires were prepared from $Cr(NO_3)_3 \cdot 9H_2O$, $Ga(NO_3)_3 \cdot xH_2O$ (x determined by DSC-TG analysis: 2.12), deionized water and dextran (75k molecular weight, average). The initial sol is composed of Cr— and Ga ions in a 2:1 ratio (for $Cr_2GaC$), and the concentration was 1.7 mol/L. After complete dissolution of the metal salt precursors, dextran is stirred into the stock solution, resulting in a gel. The amount of dextran was the same as the amount of water used (i.e., 2.5 g dextran was combined with a 2.5 mL stock solution). The dextran was dissolved in the solution by multiple repetitions of stirring and resting to yield a viscous gel with air trapped inside. The gel was allowed to rest overnight (~15-20 h) at room temperature (uncovered) to allow for sufficient evaporation to yield a viscosity suitable for wire formation.

For the wire spinning process, a small amount of the gel was spread thinly between two flat objects (e.g., a microscopy slide) by applying firm pressure. The slides were pulled apart to induce spontaneous fiber or wire formation, with both ends of the initially formed wires still attached to each glass slide. The wires were transferred onto a Petri dish, and the wires spontaneously stretched across the Petri dish. The wires were dried in air at 100° C. overnight (~1 day). Drying the wires before combustion prevented the wires from fusing or melting back into droplets of gel.

The dried, flexible wires were combusted into the desired MAX phase $Cr_2GaC$. Combustion was achieved by heating the dried wires in an inert atmosphere in a tube furnace or a microwave reactor. For the tube furnace, the wires were transferred into an alumina combustion boat which was inserted into a quartz half ampoule. This crucible/tube assembly was then placed in the tube furnace with the opening facing the gas inlet, heated to 1050° C. (2 K/min), and held at that temperature for 2 hours before cooling to room temperature. During the heating process, an argon flow of 0.2 liter/min was used to avoid oxidation of the sample.

For the microwave-assisted combustion, the wires were placed in an alumina half ampoule, which was placed in a quartz half ampoule. An insulation housing made of alumina fiber boards was used inside the microwave reactor to contain the heat. Inside the housing an alumina beaker was used to hold 7 g of activated charcoal as susceptor material to increase the initial heating. The top portion of the housing has an opening to accept the quartz half ampoule and alumina crucible assembly. Through a port in the top of the microwave reactor, argon gas is provided to the quartz half ampoule holding the wire-precursor. 0.2 L/min of argon was allowed to flow directly into the alumina crucible with the sample. To provide anaerobic conditions, the sample was flushed with argon for 15 minutes prior to heating. The microwave reactor was operated at 700 W (2.45 GHz) for a total heating time of 20 minutes. The sample was allowed to cool down inside the housing.

Both furnace and microwave heating strategies yielded predominantly $Cr_2GaC$ MAX phase, with $Cr_3C_2$ as the only crystalline side phase (based on X-ray powder diffraction analysis) as well as amorphous carbon. The wires formed in the tube furnace (FW) were characterized by a rugged/cratered surface. The wires formed in the microwave reactor (MW) were characterized by a closed and smooth surface of microwave reactor wires. Thus, the morphology of the wires was controlled by the heating techniques employed.

Scanning electron microscopy (SEM) data on both FW and MW samples were analyzed in a cross-sectional view. For this purpose, a few wires were glued between two silicon wafers. Using sandpaper initially, the side to be analyzed was ground and polished with increasing grit. Lastly, a silica suspension (~0.02 µm diameter) was used to finely polish the surface. Prior to mounting the sample, a 7 nm layer of Pd/Au was sputter coated to prevent charging of the glue surface. Similar to the FW's surface, the core region also shows significant carbon excess (>90 at-%). Since the wires were glued in place, an exact determination is not possible, however, the measurements strongly indicate excess carbon. MW cross-sections, while not showing Cr-rich areas, also have carbon excess throughout the cross sections.

In order to compare the 1D $Cr_2GaC$ microwires to the bulk material, respective bulk furnace and microwave samples were prepared. For the both syntheses, the elemental precursors Cr, Ga, and C were mixed in a 2:1.2:1 ratio (Cr: Alfa Aesar, −325 mesh, 99%; Ga: Alfa Aesar, ingot, 99.99%; C: Alfa Aesar, −325 mesh, 99.9995%) in an Ar filled glovebox. Hereby, Cr and C were pre-mixed, and then layered with Ga flakes (cut from the ingot) into the pellet die (Specac, 10 mm die). The mixture was pressed into a pellet using ~3 tons of pressure for 30 seconds, to prevent the gallium from melting completely. The obtained pellet was placed in a quartz ampoule, which was sealed under vacuum. For the furnace synthesis, the ampoule was placed in a chamber furnace (Carbolite, model CWF), in which the sample was heated to 1100° C. (10 K/min). The max temperature was held for 10 h, before cooling to room temperature. After the heating cycle, the sample was ground and repelletized, and underwent the same cycle again to increase the sample's homogeneity as well as run the reaction to completeness.

For microwave-derived microwires, the sample was heated in a household microwave oven (Panasonic, model NN-SN936B with inverter technology). To this extend, an insulation housing (custom) built from alumina fiber boards (Skyline Components, LLC, Tucson Ariz.) was placed off-center in the microwave, fitted around a ~50 mL alumina beaker. The top of the housing had a hole, in order to accommodate ampoules sticking out. 7 g of activated charcoal (Honeywell, DARKO, 12-20 mesh) were placed in the crucible, into which the ampoule was embedded. The microwave oven was run at max power level (1250 W) for 30 minutes. After cooling to room temperature, the sample was ground and repelletized. To achieve a single phase sample, the procedure was repeated 3 times total.

Iodine treatment on $Cr_2GaC$ MAX phase wires was performed on furnace samples due to their consistent electrical response with temperature. For iodine treatment, individual wires were extracted and introduced in a glass container with 500 mg of iodine that was sealed to prevent the escape of iodine vapor. The container was heated to 200° C. for 1.5 and 2 hours for two different wires. Raman and EDX measurements were carried out within 2 hours after treatment.

Bromine treatment on $Cr_2GaC$ wires was performed on furnace samples by a similar procedure as Iodine treatment. An individual furnace wire was extracted and introduced into a glass container with 2 ml of bromine and heated to 130° C. for 1.5 hour after sealing. Raman measurement was performed immediately and EDX measurements were performed 2 hours after treatment.

Figure 2B:
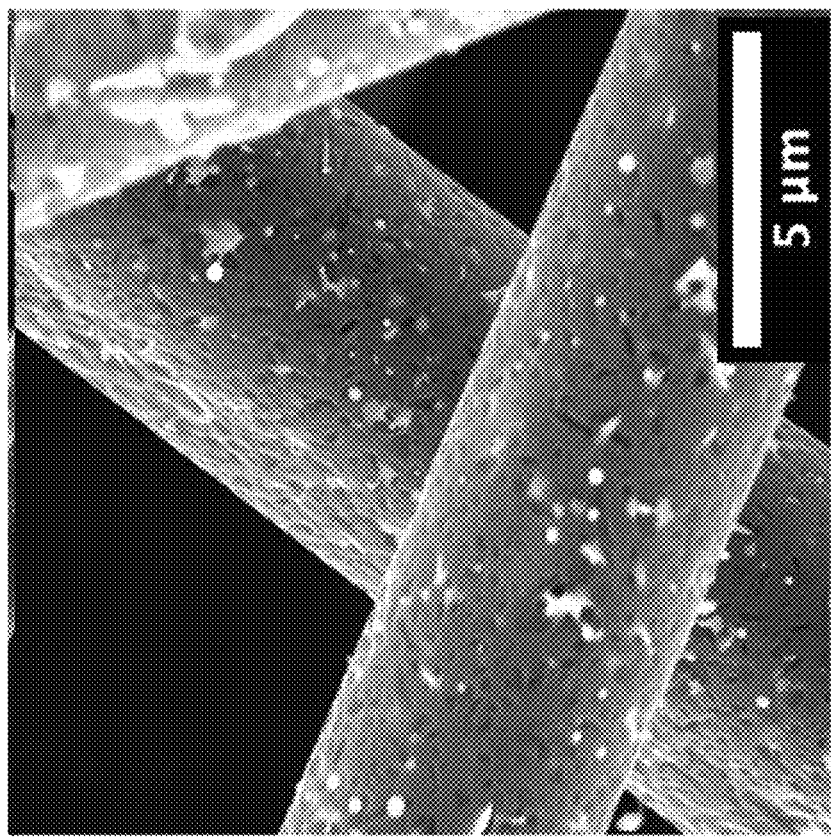
FIGS. 2A and 2B show scanning electron microscope (SEM) images of furnace-annealed MAX phase $Cr_2GaC$ microwires.
Figure 2A:
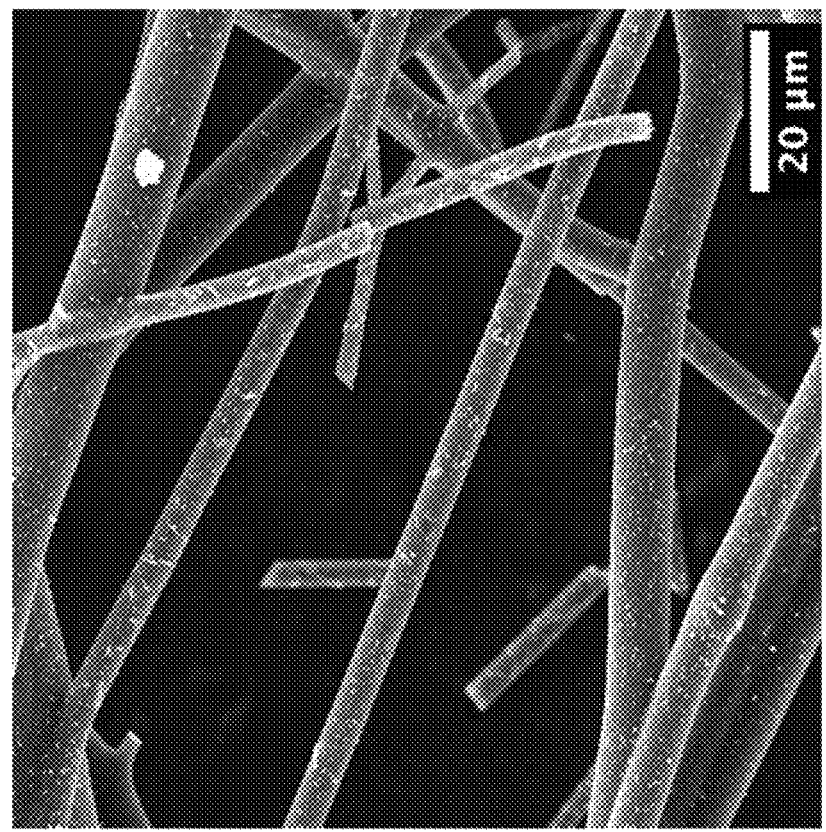

$Cr_2GaC$ MAX phase wires were formed with well-rounded curvatures and diameters ranging from a few to tens of micrometers as shown in the SEM images in FIG. 2A. As-synthesized wires were structurally characterized using laboratory-scale X-ray powder diffraction (D2 Phaser $2^{nd}$ Generation, Bruker), and to minimize anisotropic effects as much as possible, the samples were ground into a powder using an agate mortar. All data were refined using the Rietveld method and Topas. Both furnace and microwave synthesis strategies resulted in mainly $Cr_2GaC$ wires, with $Cr_3C_2$ as the dominant side phase (6-14 wt-%). Furnace wire samples exhibit a more amorphous character compared to microwave wires. Starting with furnace-derived wires (FW), the phase analysis revealed 86.2 wt-% $Cr_2GaC$ and consequently 13.8 wt-% $Cr_3C_2$, confirming the successful synthesis suggested by the X-ray diffraction (XRD) pattern. Microwave-derived wires (MW) exhibit a similar yield for the MAX phase (82.1 wt-%), however, two more side phases aside from $Cr_3C_2$ (6 wt-%) are found: $Cr_7C_3$ (5.8 wt-%) and $Cr_2O_3$ (5.5 wt-%). SEM and energy dispersive spectroscopy (EDS) studies were carried out to shed light on size, length, and morphology of the obtained wires.

Figure 3B:
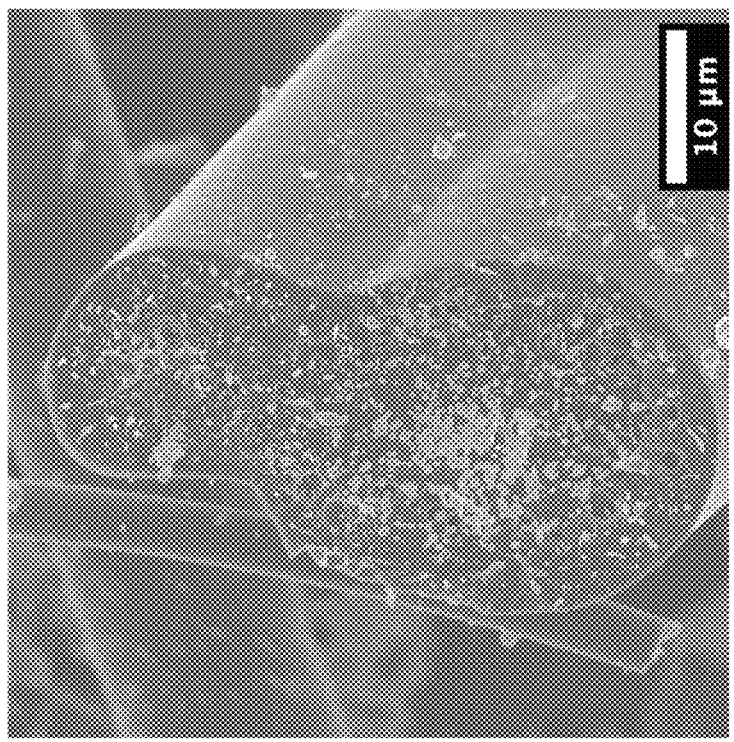
FIGS. 3A-3D show SEM images of $Cr_2GaC$ microwires annealed in a microwave reactor.
Figure 3A:
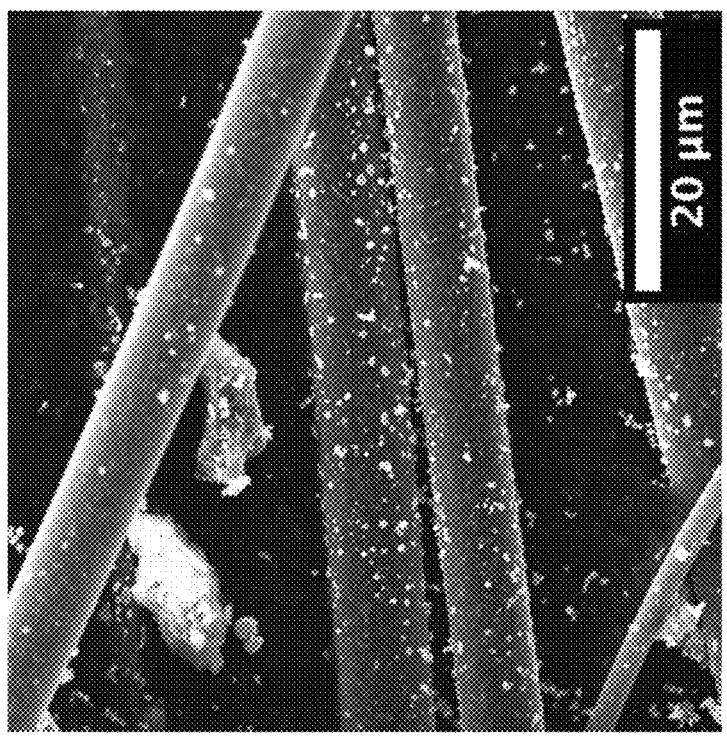

As shown in FIG. 2A, the diameter of furnace-derived wires ranges from sub-microns up to about 60 µm, which is the same for microwave-derived wires (FIG. 3A). Hence the method of combustion has no effect on the average diameter, it is fully determined by the spun, pre-combustion wire diameter. The spinning process also results in fused wires of random diameters, as shown in FIG. 3B.

The surface morphology of the furnace and microwave annealed wires show differences. While FW show a very cratered/scarred outer layer, MW exhibit a smoother, less disrupted, partly even closed surface. In both cases, the surface of the wires is decorated with smaller MAX phase particles in the nm-range (as confirmed EDS analyses). Based on EDS quantification, and in contrast to the XRD results, the wires contain a significant amount of carbon (about 96 and 92 at-% for FW and MW, respectively). As this carbon is not visible in XRD, it presents amorphous graphite.

Figure 4B:
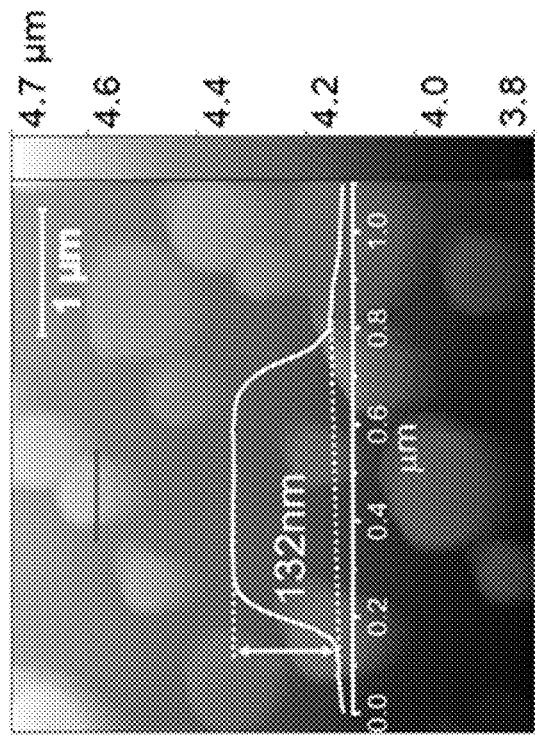
FIGS. 4A and 4B are atomic force microscopy (AFM) data (10×10 μm) showing extracted profiles for furnace-derived and microwave-derived microwires, respectively.
Figure 4A:
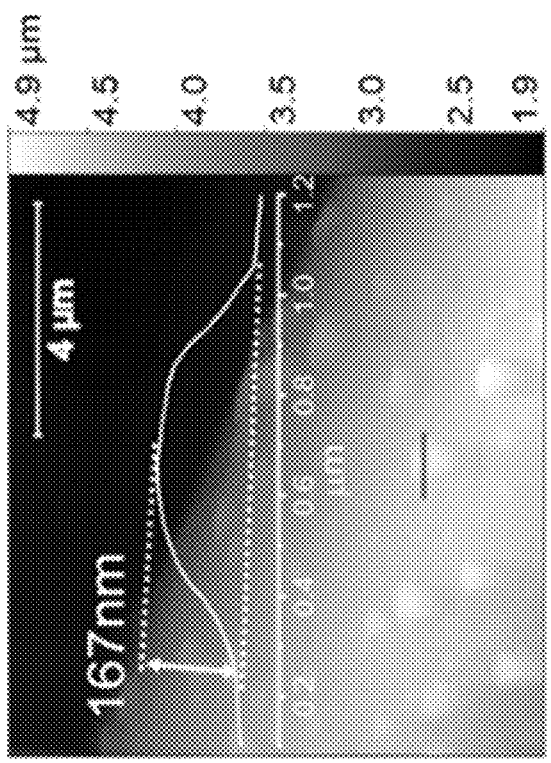

Using atomic force microscopy (AFM), these surface deposited particles were investigated in greater detail. Based on the data shown in FIG. 4A, FW depositions have an average height of 131.2 (±41.8) nm, which is very similar to the average height of MW particles (137.5 ±46.5 nm, FIG. 4B).

Figure 3D:
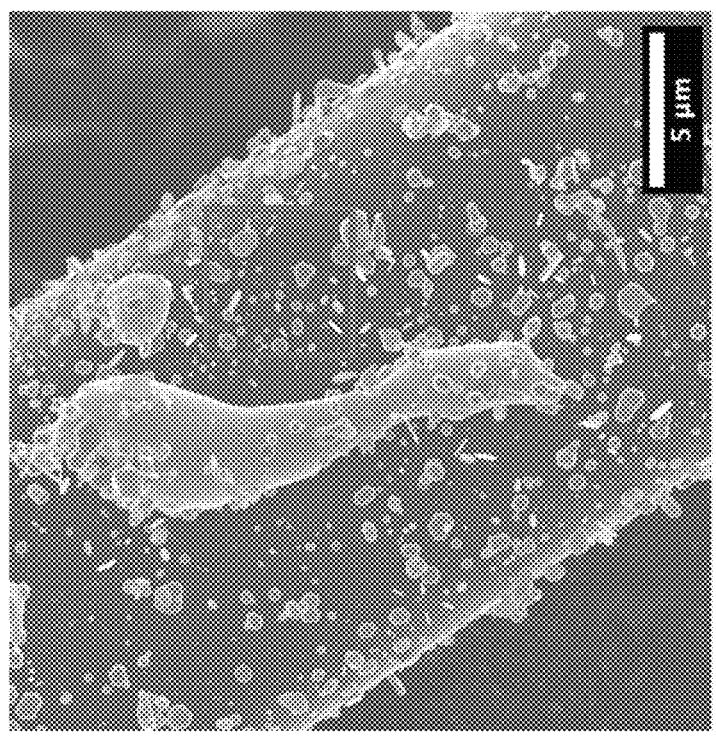
Figure 3C:
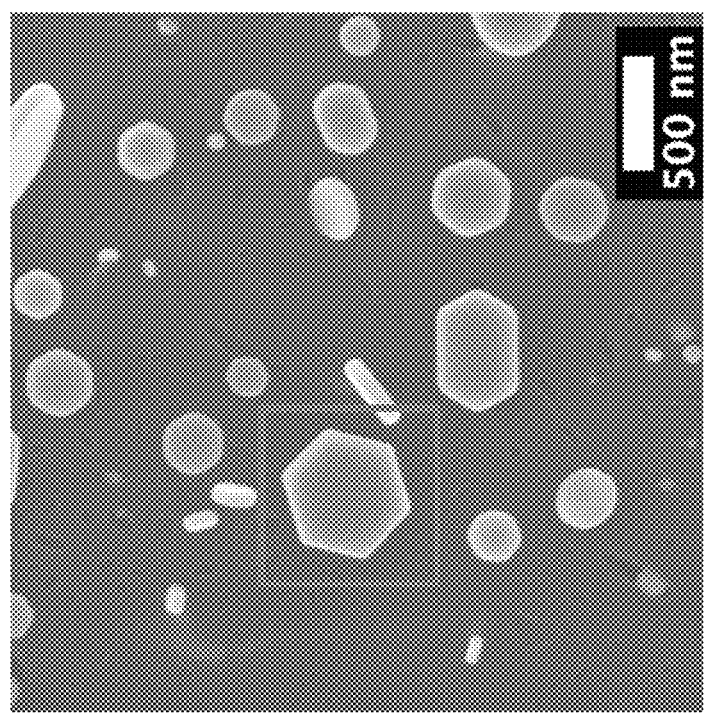

For the MW, the surface particles are less droplet-like, and in significant numbers, even hexagonally shaped particles, as shown in FIG. 3C. Based on the SEM investigation of the wires, the known side phase $Cr_3C_2$ must be perfectly mixed into the wire surface, on a very small scale, as high spatial resolution EDS could not identify single $Cr_3C_2$ particles. However, the MW exhibit a few randomly distributed Ga segregations on the wire surface, as shown if FIG. 3D and confirmed by line scans performed across those segregations. The presence of elemental Ga could have two possible explanations, one being an unreacted, and reduced Ga particle, the other possibility could be rooted in the heating process. Since microwave assisted synthesis has a relatively fast heating profile compared to the furnace assisted synthesis, Ga could, once reduced, diffuse out of the wire and segregate upon the likewise fast cooling.

The inside of the wires also differs depending on the annealing technique. In FW, Cr is prevalent alongside C in the core region, which indicates $Cr_3C_2$ accumulation inside the wire, which is in line with the XRD data. The carbon content inside the wires is similar to the amounts measured on the surfaces, however, exact quantifications are difficult to achieve due to the glue used to prepare the cross-sectional view. Grain sizes for $Cr_3C_2$ were determined to be around 650 nm, meaning the $Cr_3C_2$ phase represents accumulations of said phase. MW, on the other hand, are entirely homogeneous throughout the entire cross section. A potential reason for this difference could be the differing heating rates. The furnace ramping speeds (2° C. per minute) might allow for sufficient crystallite growth and diffusion compared to the faster rates achieved in the microwave oven and result in the differing cross sections. Looking at the different MAX phase grain sizes (also determined by means of XRD), a similar trend is observed: while FW have grain sizes around 190 nm, MW grain sizes amount to only around 70 nm, further supporting the hypothesis of different crystallite growth/mass diffusion rates caused by the different heating techniques.

Electrical Properties of MAX Phase $Cr_2GaC$ Microwires

As the electronic properties in the mesoscopic range can significantly differ from the bulk counterpart, resistivity measurements were performed on individual carbonaceous $Cr_2GaC$ microwires.

Figure 5A:
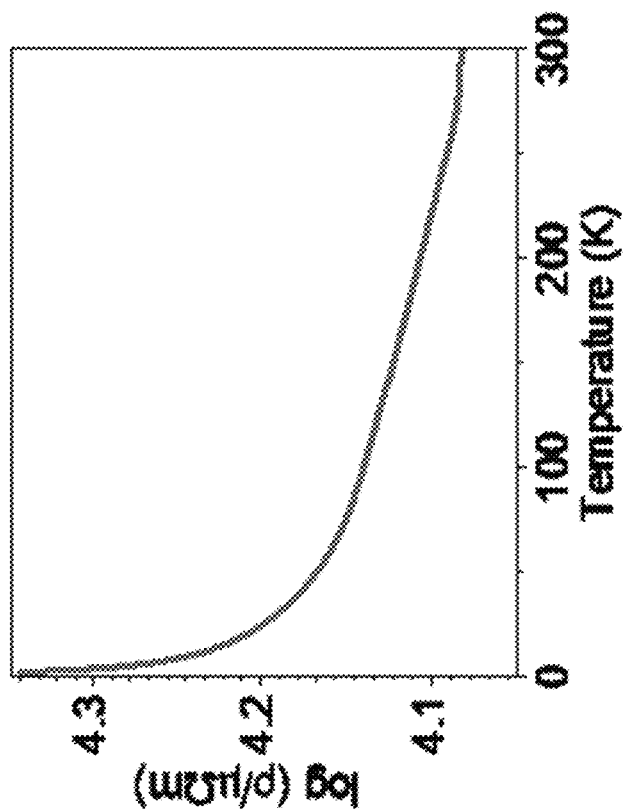
FIG. 5A shows a resistivity vs. temperature plot for a typical furnace-derived carbonaceous $Cr_2GaC$ microwire.
Figure 5B:
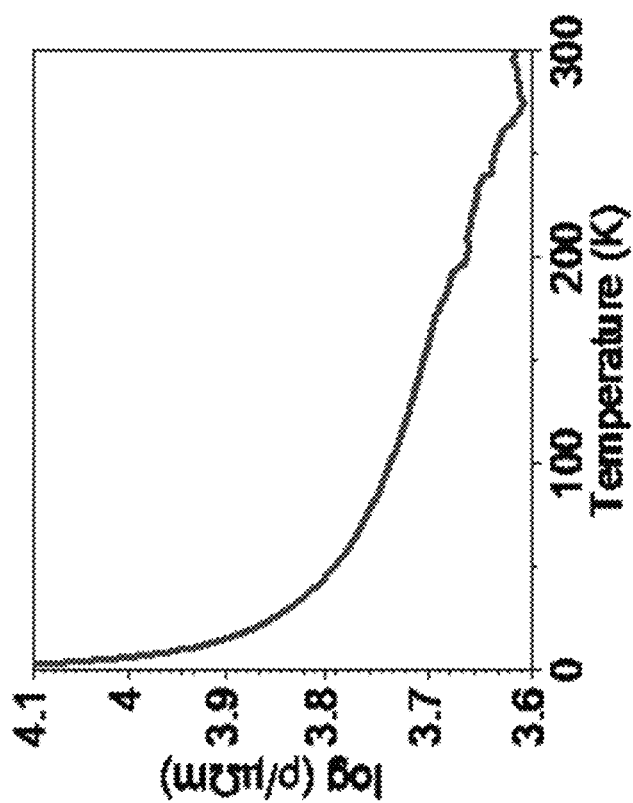
FIG. 5B shows a resistivity vs. temperature plot for a typical microwave-grown wire.

Bulk samples (i.e., pellets) of $Cr_2GaC$ MAX phase material were prepared from elemental precursors grown by both microwave and furnace-based methods and resistivity measurements were performed on them. Bulk samples synthesized both in the microwave oven and furnace follow the conventional metallic trend. In contrast to these typical responses from MAX phase pellets, as shown in FIGS. 5A and 5B, the resistivity of carbonaceous $Cr_2GaC$ microwires increases with decreasing temperature for all furnace-derived samples and for majority of microwave derived samples as opposed to the conventional metallic response. Typical room temperature resistivity values measure in the mΩm range, which is roughly three orders of magnitude higher compared values measured on metallic $Cr_2GaC$ samples. Since the fundamental electronic transport in single crystalline $Cr_2GaC$ is anticipated to be metallic-like (reduced resistivity at low temperature), the observed insulating-like response (increased resistivity at low temperatures) suggests that the electronic transport is dominated by excess amorphous carbon present in the system.

The temperature dependence in FIGS. 5A and 5B can be well fitted to 3D Mott variable range hopping (VRH) model given by:

$$\rho(T) = \rho_0 \exp\left(\frac{T_{Mott}}{T}\right)^{0.25} \quad (1)$$

where $\rho_0$ is a resistivity prefactor and $T_{mott}=A/(k_B N(E_f)\xi^3)$ is the characteristic temperature.

Here, A is a prefactor taken as 16, $k_B$ is the Boltzman constant, $N(E_f)$ is the density of states at the Fermi level which varies slowly, and $\xi$ is the electron localization length. The VRH fitting of FW and the MW to this model using the Levenberg Marquardt algorithm indicates a hopping mechanism at a low-T regime (2 K-170 K). The parameters $\rho_0$ and $T_{Mott}$ derived from the best fit are listed in Table 1. Using the previously reported $N(E_f)$ value, these fitting results have shown that the localization length is in the range of 5.30-12.74 nm which agrees well with the amorphous character of carbon. These localization length values signify the decay length of the localized wavefunctions. Small values of compared to the wire dimension is indicative of a necessary hopping mechanism for conduction at low T. The VRH fitting shows a considerable deviation for some cases at higher temperatures which can be related to thermally activated conduction processes.

While the resistivity of most of the MW obeys the variable range hopping, two other responses were observed from certain MW samples in their ρ vs. T, namely "metallic" response and a combination of metallic and insulating-like behavior. The "metallic" response can be attributed to crystalline $Cr_2GaC$ as well as graphitization at high temperature during the synthesis and can be modelled as classical Drude metallic resistivity, i.e, $\rho=\rho_o+\rho_m=\rho_o+A*T^m$, where $\rho_o$ is the defect and impurity dominated residual resistivity at low temperatures, A is a temperature dependent weight factor and m is temperature dependent exponent related to different scattering mechanisms. Fitting this expression to the metallic ρ vs. T data at different temperature ranges produces a set of values of $\rho_o$, A and m, which are reasonable within standard metallic conduction. Analysis of the data at low temperature (11-85 K) shows m~2.3. The $T^{2.3}$ dependence can be attributed to the interplay of e-e scattering, Umklapp process, and interband scattering of the conduction electrons. The high temperature regime (210-300 K) of the metallic curve gives rise to T-linear dependence which originates from increased electron-phonon interaction at elevated temperature. The scattering phenomena at the intermediate range (85-210 K) are most probably a combination of the low and high-temperature interactions as mentioned above.

Another observed response in MW is non-monotonic behavior that can be described as a transition or cross-over between insulating and metallic-like behavior. One potential reason for this response might be associated with disorder induced multiple scattering in the electronic states near Fermi level ($E_f$), such as quantum interferences due to weak localization and electron-electron interaction in a disordered system. Another possibility is the series resistivity contribution from insulating-like response (from amorphous carbon) with lower room temperature resistance and metallic-like conduction (from $Cr_2GaC$) with high $r_o$ value. In such a case, as the temperature is lowered, the total resistivity is dominated by the insulating response once the metallic resistivity drops below the insulating range.

The porous surface and low-dimensionality of carbonaceous MAX phase $Cr_2GaC$ microwires offer large surface to volume ratios and promote greater degrees of interaction with the halides (bromine or iodine vapor). Besides the surface architecture, vdW gaps in amorphous carbon provide ample scope for halogen intercalation between carbon layers.

Because of chemical incompatibility of Au or Ag electrical contacts with halide vapors, FW microwires were contacted with iodine (or bromine) vapor at 200° C. for 1.5 and 2.0 hours and created 4-terminal contacts after the treatment to access their transport properties. After the iodine treatment, the presence of iodine in $Cr_2GaC$ MAX phase based wires was confirmed by EDS elemental mappings. Estimates from EDS semi-quantitative analysis performed within 2 hours of exposure shows uniform distribution of iodine. The presence of iodine can be further evidenced by the prominent iodine anion Raman peaks located at 101 and 160 $cm^{-1}$, corresponding to the stretching modes of $I_3^-$ and $I_5^-$ anions formed by charge transfer within the carbonaceous $Cr_2GaC$ wire. No Raman peak corresponding to molecular iodine (180 $cm^{-1}$) eliminates the possibility of iodine accumulation inside the material.

TABLE 1

Parameters $\rho_0$ and $T_{Mott}$ obtained from Mott variable range hopping (VRH) fitting of ρ vs. T data for insulating-like samples.

| Synthesis Method | Diameter (μm) | Temperature range (K) | $\rho_0$ (μΩm) | $T_{Mott}$ (K) | $R^2$ | Localization Length $\xi$ (nm) |
| --- | --- | --- | --- | --- | --- | --- |
| Microwave | 73.53 ± 5.90 | 2-180 | 2993.92 ± 12.53 | 12.75 ± 0.26 | 0.99447 | 5.30 |
| Furnace | 83.16 ± 1.05 | 2-150 | 1174.91 ± 6.84 | 1.71 ± 0.08 | 0.97509 | 10.36 |
| Furnace | 50.75 ± 1.40 | 2-300 | 604.45 ± 0.89 | 0.92 ± 0.02 | 0.99449 | 12.74 |
| Furnace | 30.68 ± 1.39 | 2-300 | 417.08 ± 1.12 | 1.16 ± 0.03 | 0.98823 | 11.79 |
| Furnace | 10.30 ± 0.47 | 2-124 | 99.15 ± 0.24 | 1.04 ± 0.03 | 0.98110 | 12.23 |
| Furnace | 9.54 ± 0.20 | 2-300 | 201.34 ± 0.92 | 1.06 ± 0.04 | 0.98745 | 12.15 |

Figure 6:
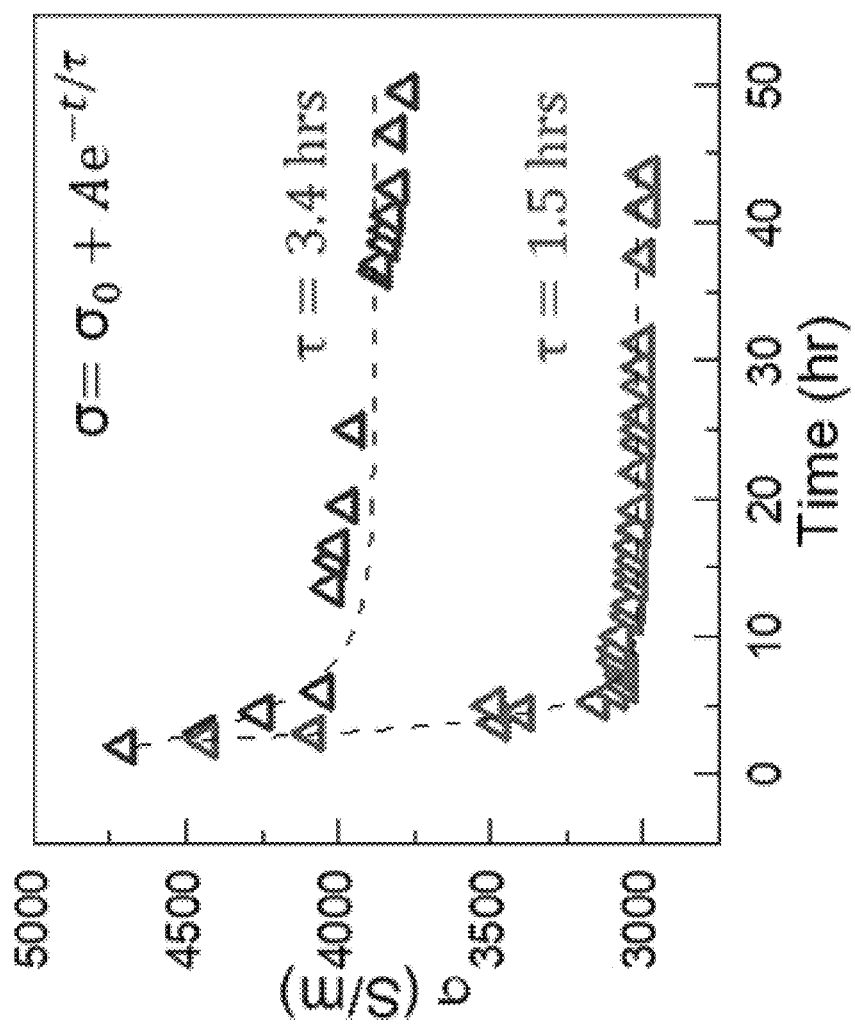
FIG. 6 shows the time dependent conductivity of a brominated microwire. The red dashed line is the fit to the equation $\sigma = \sigma_o + Ae^{-t/\tau}$ with derived parameter $\tau = 9.1$ hrs.

Measurement of time dependent electronic properties after halogen treatment can give insights into the diffusion dynamics of the volatile dopants, which can be useful for gas sensing applications. FIG. 6 shows the time-dependent conductivity of the iodinated individual microwires after iodine exposure. The time axis refers to the time after the halogen treatment is completed. The overall conductivity increases significantly after halogen treatment and falls with time t following the equation in the form of $\sigma = \sigma_o + Ae^{-t/\tau}$, see fitted curves in dashed lines in FIG. 6. This indicates that the conductivity of the wires can be improved by a simple post-processing halogen treatment technique. The parameter $\sigma_o$ is the saturation conductivity. A is the difference between conductivity at time t=0 and $\sigma_o$, and $\tau$ correspond to the characteristic time for decay. From A and $\sigma_o$ values derived from the fitted data, it was found that the conductivity was enhanced by 260% and 36% for the two wires shown in FIG. 6, suggesting halogen diffusion is highly effective in boosting the electrical properties. The parameters obtained from fitting are listed in Table 2. $\tau$ changes within the order of hours (FIG. 6). Since iodine is present inside the wires in anion form, the treatment is likely to increase the conductivity by increasing the overall hole carrier density. As the conductivity shows a time response mainly described by the diffusion process, it also suggests that iodine anions diffuse out of the MAX phase matrix with time coefficients of 1.5 and 3.4 hours. Table 3 provides the results of similar measurements on a microwire exposed to bromine. This time dependent conductivity response of doped samples makes carbonaceous $Cr_2GaC$ microwires potential candidates for chemiresistive halogen gas sensors.

In a set of examples for chitosan-based synthesis (thick films and microspheres), the metal stock solution was set at 0.75 M with a ratio of 2 equivalents of Cr and one equivalent of Ga. In chitosan-syntheses, 1 mL of said stock solution was used as a fixed amount of metal ions (i.e., 7.5 mmol). Three different stock gel compositions were used: 2, 3, and 3.5 g of chitosan in 100 mL of 0.2 M acetic acid, whereby higher amounts of chitosan than 3.5 g/100 mL couldn't be reasonably achieved.

Additionally, the viscosity reached with 3.5 g of chitosan required manual stirring as the magnetic stir bar was not able to homogenize the mixture. Out of each of these 100 mL, multiple ratios of gel-to-metal-solution were mixed and used for further processing (i.e., either for thick films or microspheres). The different volumes used were 5, 10, 15, 20, and 40 mL of chitosan gel, each mixed with 1 mL of metal solution. This matrix of parameters allowed to test both the effect of carbon amount ("volume of gel") to metals as well as the viscosity. Table 4 provides the study parameters. Lower drying temperatures (e.g., in a range of about 30° C. to 40° C.) were favorable for thick film synthesis because the films showed an increased degree of curling/cracking at elevated temperatures. In case of microspheres, for each set of parameters both 35° C. and 100° C. drying temperatures were analyzed.

TABLE 2

Parameters $\sigma_o$, A and $\tau$ derived from $\sigma = \sigma_o + Ae^{-t/\tau}$ fitting to the $\rho$ vs. t data of iodinated $Cr_2GaC$.

| Wire radius (μm) | Treatment time (hr) | $\sigma_0$ (S/m) | A (S/m) | $\tau$ (hr) |
|---|---|---|---|---|
| 35.55 ± 1.68 | 1.5 | 3017.90 ± 12.67 | 7986.20 ± 1101.90 | 1.4 ± 0.1 |
| 21.51 ± 0.67 | 2 | 3884.01 ± 23.03 | 1399.22 ± 269.77 | 3.4 ± 0.8 |

TABLE 3

Parameters $\sigma_o$, A and $\tau$ derived from $\sigma = \sigma_o + Ae^{-t/\tau}$ fitting to the $\rho$ vs. t data of brominated $Cr_2GaC$ based carbon wires.

| Wire radius (μm) | Treatment time (hr) | $s_0$ (S/m) | A (S/m) | % increase in conductivity ($S/s_0$) | t (hr) |
|---|---|---|---|---|---|
| 56.90 ± 2.37 | 1.5 | 1573.45 ± 2.69 | 127.78 ± 4.13 | 8.1 | 9.10 |

Thick Film and Microsphere Synthesis

The use of chitosan in the synthesis of MAX phase thick films and microspheres provides viscosity (entanglement of cation loaded polymer chains) to make thick films, with the potential to use differently shaped molds. For nonporous microspheres, the solubility and insolubility of chitosan in acidic and basic media, respectively, yields spherical "beads" forming spontaneously. For the hollow microspheres, a biopolymer that carries negative surface charges (captures the metal cations) and acts as a template is used.

TABLE 4

Varied parameters of the chitosan-based syntheses. For each gel volume used the actual mass of chitosan is given, hence the chitosan:metal ratio increases from left to right and top to bottom.

| | Mass of chitosan per volume/g | | | | |
|---|---|---|---|---|---|
| | 5 mL | 10 mL | 15 mL | 20 mL | 40 mL |
| 2 g gel | 0.1 | 0.2 | 0.3 | 0.4 | 0.8 |
| 3 g gel | 0.15 | 0.3 | 0.45 | 0.6 | 1.2 |
| 3.5 g gel | 0.175 | 0.35 | 0.525 | 0.7 | 1.4 |

In some examples, the annealing temperature of 1050° C. yielded acceptable results both in terms of MAX phase yield and crystallinity. Lower temperatures can lead to oxide remnants, whereas higher temperatures can result in the formation of binaries, such as $Cr_3C_2$. A typical heating rate of 2 K per minute prevents the formation of oxides in sol-gel syntheses, and reduces the disruption of surfaces by outgassing byproducts due to the slower reaction progression. A heating time (defined herein as "dwell time") of 5 hours yields acceptable results without notably decomposing the MAX phase, which can occur after longer reaction times (typically the thermodynamically favorable $Cr_3C_2$ forms), while shorter reaction times can result in incomplete reactions (i.e., oxide remains). Due to the "bulkier" nature of the microspheres, these parameters can be used to achieve acceptable results. The considerably smaller/thinner films and hollow microspheres, however, require shorter reaction times, which is the reason for reducing the dwell time only for thick films and hollow microspheres.

Thick Film Synthesis

Thick Film Synthesis Example 1. The biopolymer chitosan (Sigma Aldrich, 99%) was used as a carbon source. Stoichiometric amounts (1 mL; 0.75 M; 2 eq. Cr to 1 eq. Ga) of Cr(III) nitrate nonahydrate (99%, Sigma Aldrich) and Ga(III) nitrate hydrate (99%, Alfa Aesar) were combined with various amounts of chitosan (see Table 4) in water to form a viscous solution. This precursor gel was cast into a petri dish (10 cm diameter) as a mold, which was subsequently dried in air at 35° C. overnight. The resulting flexible films were calcinated using a tube furnace (Carbolite). With a heating rate of 2° C. per minute, the films were calcinated for two hours at 1050° C. before allowing the furnace to cool down naturally. An inert Ar atmosphere was ensured throughout the heating procedure to prevent oxide formation.

Figure 7B:
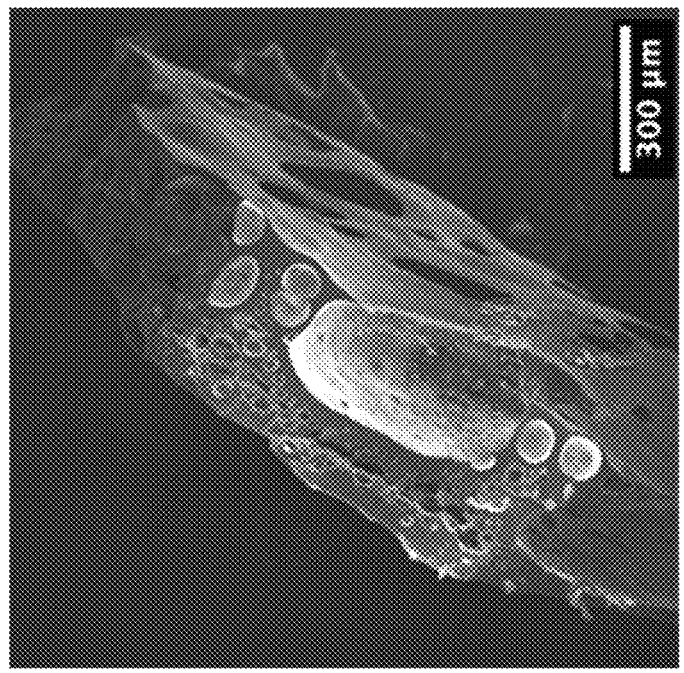
FIGS. 7A and 7B are SEM images of MAX phase thick films that are approximately 20 μm and an approximately 350 μm thick, respectively.
Figure 7A:
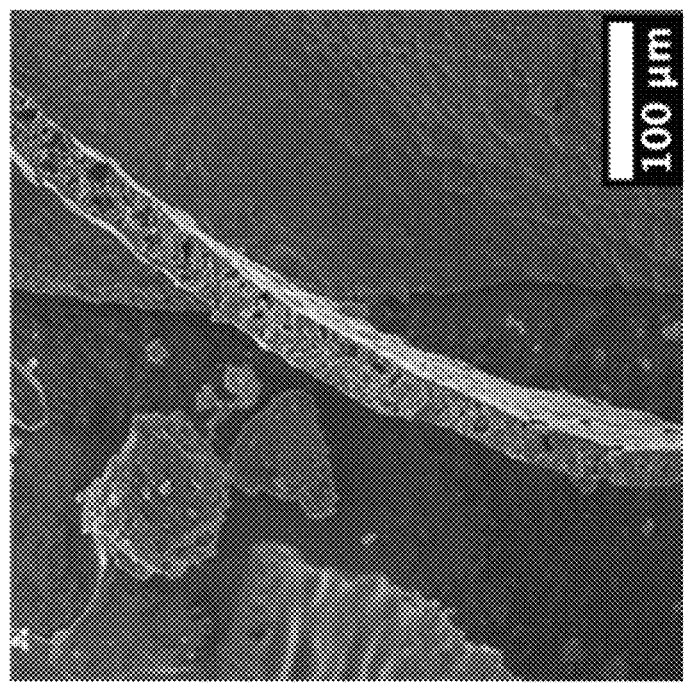

Based on the analyzed synthesis parameters (Table 4), the thickness of the films gradually increases from 5 mL (3 g gel, thinnest) to 40 mL (3.5 g gel, thickest), essentially based on the chitosan content. Using SEM, approximate thickness values were determined for each chitosan amount. FIGS. 7A and 7B show the thinnest (approximately 20 μm) and thickest (approximately 350 μm) films synthesized, respectively. The surface morphology of all investigated thick films presented a very similar surface.

Thick Film Synthesis Example 2. Thick films were prepared from $Cr(NO_3)_3.9H_2O$, $Ga(NO_3)_3.xH_2O$ (x determined by DSC-TG analysis: 2.12), deionized water, and chitosan (medium molecular weight, 75-85% deacetylated). The initial sol had Cr and Ga ions in a 2:1 ratio (for $Cr_2GaC$) and a concentration of 0.375 mol/L (total amount of Cr and Ga). One gram of chitosan was dissolved in a separate vessel containing 50 mL of a 0.2 M acetic acid solution. The complete dissolution process took up to 30 minutes and yielded an aerated, viscous solution. 1 mL of the Cr/Ga stock solution (0.375 M) was added to 10 mL of the dissolved chitosan and fully homogenized. This purple chitosan/metal solution was cast into a 10 cm (diameter) Petri dish, in which the precursor mixture was dried at 35° C. in air overnight. After drying, the precursor films obtained were flexible (bendable). To synthesize the MAX phase, the precursor films were placed in an alumina boat and combusted at 1050° C. for 2 hours in flowing argon (0.2 LPM). The heating rate was set at 2 K/min for the heat-up, whereas the furnace was cooled naturally to room temperature. After the calcination process, the desired MAX phase $Cr_2GaC$ thick films were obtained without any further processing.

Thick Film Synthesis Example 3. A thick film was synthesized using 10 mL of the 2 g/100 mL gel. Using the polycation chitosan (D-glucosamine and N-acetyl-D-glucosamine units, linked via β-1,4), gels containing metal ions sequestered along the polymer chains were prepared, resulting in a castable gel. Drying and calcinating films prepared in this way produced thick film $Cr_2GaC$ MAX phase. Based on the Rietveld refinement, the films include mostly the desired MAX phase with about 87 wt-%, and small amounts of $Cr_3C(C_{1-x}N_x)$ as a side phase. This side phase is a defect-structure of $Cr_3C_2$, which would be the more expected side phase. Based on the fact that chitosan carries a $NH_2$-functionallity per monomer, the nitrogen content is significantly increased compared to the citric acid-based approach. And since the reaction goes through a fully reduced nitrogen, it is plausible to see small amounts of nitrogen partake in the reaction, especially at temperatures around 1000° C. The denotation 1–x refers to the fact that based on XRD no credible assertion can be made about the actual C:N ratio, but it shall be noted that the original reported numbers based on neutron diffraction suggest only a small nitrogen doping of $Cr_3C(C_{0.52}N_{0.48})$.

Table 5 shows the MAX phase yields for all investigated parameter combinations provided in Table 4. A clear trend in overall yield becomes evident, where a higher chitosan content leads to increased side phase formation, both from left to right as well as within a column. Below a certain threshold no MAX phase formation was observed (5 mL; or 0.1 g of chitosan to 7.5 mmol of metals), with a following gradual increase of MAX phase yield in the 5 mL column up to the maximum yield achieved using 0.2 g (10 mL) chitosan.

TABLE 5

Results of the Rietveld refinements of each parameter set showing the $Cr_2GaC$ in wt-%. Higher chitosan amounts result in lower MAX phase yield (left to right and top to bottom).

| | wt-% $Cr_2GaC$ (from refinement of XRD data) | | | | |
| --- | --- | --- | --- | --- | --- |
| | 5 mL | 10 mL | 15 mL | 20 mL | 40 mL |
| 2 g Chitosan | 0 | 87.3 | 82.9 | 78.1 | 18.5 |
| 3 g Chitosan | 48 | 76 | 60 | 42.9 | 10.7 |
| 3.5 g Chitosan | 79.5 | 53 | 59 | 31 | 4.3 |

The films were partly curled, which is the result of the precursor film being curled. Hence, drying parameters or, more generally, the precursor-film appearance, are shape-determining for the post-calcination films. Here, both the chitosan:metals ratio as well as the chosen drying temperature influence the precursor film appearance. Besides the 1 mL of metal solution, as described above, the doubled concentration was investigated as well. Furthermore, a drying temperature of 100° C. was considered besides the 35° C. to investigate the film forming effects in greater detail. Generally, the higher the metals concentration is, the more cracking is observed, which can be caused by more metal ions occupying the polymer chains and thus decreasing inter-polymer chain interactions. The resulting film is therefore less stable, observable in the cracks. By increasing the drying temperature to 100C., the curling of the films is significantly more pronounced. These effects are observed to be additive, with increased metal concentration and increased drying temperature resulting in a more curled and more cracked film than the respective smaller concentration and cooler dried films.

After combustion, the films lose an amount of their pre-calcination flexibility, however they are still bendable and can be handled rather easily (e.g., with a pair of tweezers). The thickness of the films ranged from about 20 µm to over 300 µm in the range of the preparation parameters (refer to FIGS. 7A and 7B). Other than influencing film thickness, the chitosan content did not affect the surface morphology in any notable way. Although the film surface turned out to be closed/smooth, inside the films the same porosity was observed as in non-shape controlled $Cr_2GaC$ prepared by sol-gel chemistry. Layered structures, however, are not visible, which is attributed to the pre-determined shape/morphology in which the MAX phase is forced to form, as well as the fact that the precursor film was dried and thus, less gaseous products formed that could disrupt the structure and reveal these features. EDS mappings demonstrate a homogenous distribution of the elements, with a Cr:Ga ratio close to the expected 2:1 ratio.

Nonporous Microspheres

The synthesis of MAX phase microspheres takes advantage of the solubility of chitosan in acidic solutions and its insolubility in alkaline environments. Spheres are obtained via the pH dependent precipitation of chitosan in alkaline (e.g., ammonia) solutions. 35° C. and 100° C. were investigated as drying temperatures. Table 6 shows the yields. The morphology of the microspheres depended on the viscosity of the gels, whereas higher viscosities led to a gradual increase in "tear drop"-like shapes, and in extreme cases to string-like precipitation and lastly, inability to push the gel through the dispensing tip. Below pH 12 no clear definition of the microsphere structure was attainable, meaning that for the synthesis of microspheres a high ammonia concentration is preferable. Drying the precursor microspheres at 100° C. did not affect the pre-calcination appearance, in some cases it tended to reduce the yield, which is in-line with the generally advisable slow heating rate in sol-gel chemistry. Additionally, the post-calcination microspheres showed slight changes in their morphology, in that they often carried an "outer layer" that crumbled off the sphere when handled.

TABLE 6

$Cr_2GaC$ yields based on Rietveld refinements of all synthesized microspheres.

| | wt-% $Cr_2GaC$ of 35° C. | 100° C. dried samples (from refinement of XRD data) | | | |
|---|---|---|---|---|---|
| | 5 mL | 10 mL | 15 mL | 20 mL | 40 mL |
| 2 g gel | 0\|0 | 64\|62 | 60\|51 | 57\|23 | 55\|11.5 |
| 3 g gel | 91.6\|85 | 60\|74 | 38\|43.5 | 36\|37 | N/A |
| 3.5 g gel | 55\|68 | N/A | N/A | N/A | N/A |

N/A represents conditions where no spherical precursor was obtained due to the gel's viscosity.

Figure 8B:
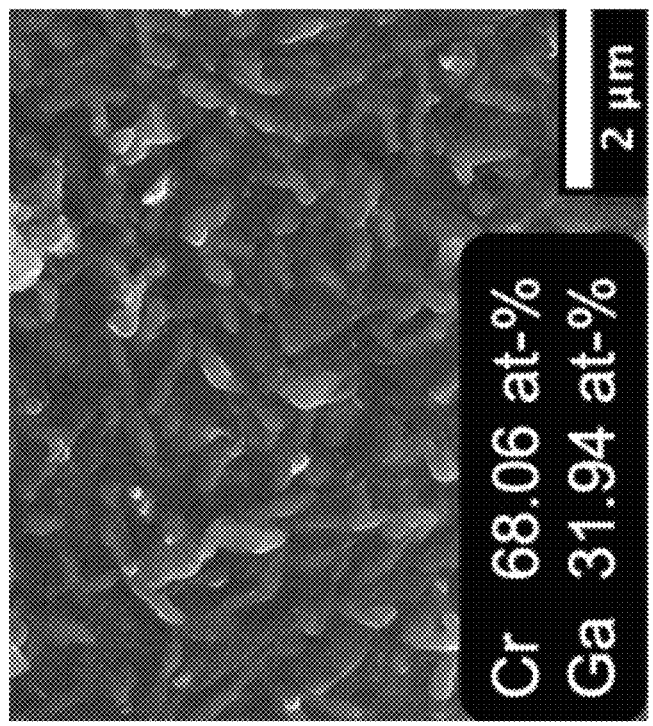
FIG. 8B is an SEM micrograph showing the surface morphology of a microsphere (calcinated), as well as the energy dispersive spectroscopy (EDS) quantification of Cr and Ga from FIG. 8A.
Figure 8A:
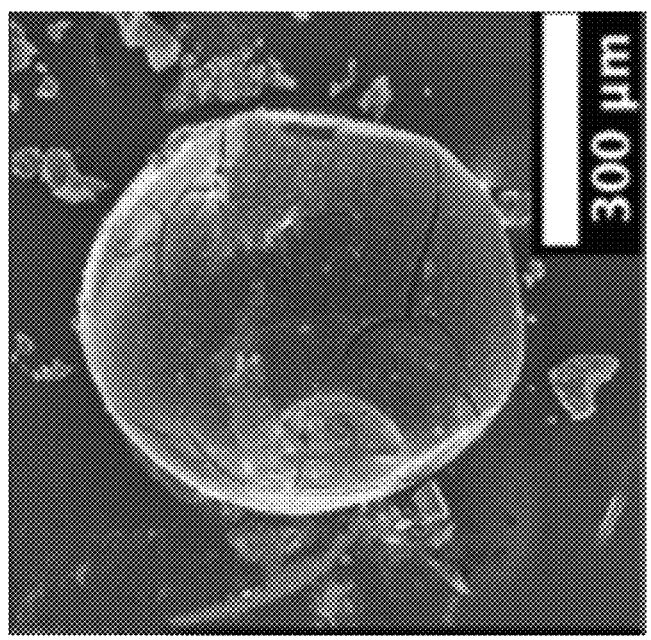
FIG. 8A shows a nonporous $Cr_2GaC$ MAX phase microsphere.

Using a light microscope, the synthesized microspheres were analyzed to determine the pre- and post-combustion diameters. Diameters were about 2 mm prior to drying and decreased considerably upon drying (about 60%, based on diameter, refer to Table 7). They further shrank through the heating procedure, by an additional 40% roughly (based on diameter, see Table 4), to an average size of 500 µm. An example of a typical nonporous MAX phase microsphere is shown in FIG. 8A. These values are based on synthesis conditions of 3 g gel, 5 mL, (Table 6), 35° C. drying temperature. The other gel compositions were also tested (with fewer microspheres), granted they generated spherical precipitates. The gel composition did not affect the diameter, however, the increased drying temperature resulted in a slight decrease in diameter of the dried precursor microspheres. Post-calcination this effect was not observable, meaning the drying temperature only affects the precursor. No significant differences between batches were observed, indicating the approach reproducibly generates specific diameters. The wet microspheres were still malleable and thus, due to them sticking together in the petri dish, not all microspheres were spherical. This is noticeable in the standard deviation of the wet spheres (Table 7), which is an order of magnitude higher than for the dried and calcinated microspheres.

TABLE 7

Number, and state of the measured microspheres used to calculate the average diameter, and shrinkage compared against both the wet and the dry microspheres. A standard deviation is also given.

| | Wet | Dry | Calcinated |
|---|---|---|---|
| # Spheres | 56 | 67 | 100 |
| Diameter/mm | 2.019 | 0.8189 | 0.492 |
| Standard deviation | 0.169 | 0.0796 | 0.049 |
| Shrinkage/% (vs. wet) | — | 59.438 | 75.631 |
| Shrinkage/% (vs. dry) | — | — | 39.921 |

Structural characterization of the product obtained with synthesis conditions 3 g chitosan gel, 5 mL (Table 6) reveals mainly MAX phase Cr2GaC (92 wt-% based on Rietveld refinement method), with $Cr_3C_2$ as the only side phase. The quantification of Cr and Ga results in an ideal 2:1 ratio (FIG. 8B), reflecting the successful synthesis also indicated by the Rietveld refinement of the XRD data. The microspheres, for the most part, exhibit craters/cracks disrupting the otherwise mostly closed/smooth surface. The microsphere interior is dense, compact, and virtually pore-free. FIG. 8B is a representative electron micrograph of the surface morphology, which is more uniform than what was observed in the thick film cross sections. The texture resembles embedded plates, in line with the layered nature of MAX phases.

In another example of the synthesis of nonporous microspheres, a chitosan stock solution was prepared (1 g chitosan in 50 mL of 0.2 M acetic acid), to which 10 mL of a Cr/Ga solution with a molar ratio of 2:1 (concentration: 0.75 M) was added and homogenized. The acidic metal/chitosan solution was dispensed in an alkaline solution (e.g., 1 M $NH_4OH$ solution) to yield precipitated structures (e.g., in the form of spheres). Purple precipitated structures (diameter of about 2 mm) formed due to the insolubility of chitosan in alkaline environments. For this, a syringe equipped with blunt dispensing tips (gauges 18, 20, 23) was used, meaning the diameter of the precipitated structures was controllable (and predictable) by the gauge size. After separating the precipitated structures via filtration from the alkaline solution, the precipitated structures were spread out into Petri dishes and dried in air at 40° C. overnight to yield microsphere precursors. Drying led to shrinkage such that the microsphere precursors had an average diameter of 0.8 mm. To obtain the desired MAX phase microspheres, the dried microsphere precursors were calcinated according the previously described heating process, with the dwell time being increased from 2 hours to 5 hours, to yield the MAX phase microspheres. After calcination, black microspheres were obtained without any further processing. Microspheres obtained by furnace calcination exhibited dense/nonporous (e.g., pore-free) interiors and closed surfaces with few cracks/craters.

For well defined, spherical depositions a pH of at least ~12 is preferable. Below this threshold a gradual decrease in definition is observable. Inseparable precipitates synthesized only in slightly basic conditions. The drying temperature did not show an effect on the precursor morphology, however, there was an observable change in post-combustion surface morphology. Based on the parameter matrix (Table 6), the shape of the precipitates varied based on the viscosity of the gel. Table 8 gives an overview of the achieved shapes for each of the parameter sets, ranging from spherical to stringy. In Tables 8 and 9, "yes" means spheres formed, "tailing" and "initial tailing" refer to an elongated tip, "teardrop" refers to a very pronounced elongated tip, and "strings" refer to non-spherical precipitates

TABLE 8

Overview of the precipitated microsphere appearance.

| | "sphericalness" | | | | |
| --- | --- | --- | --- | --- | --- |
| | 5 mL CH | 10 mL CH | 15 mL CH | 20 mL CH | 40 mL CH |
| 2 g CH in 100 mL | yes | yes | yes | yes | yes |
| 3 g CH in 100 mL | yes | initial tailing | tailing | tailing | teardrop |
| 3.5 g CH in 100 mL | initial tailing | tailing | strings | N/A | N/A |

The microspheres were about 2 mm in diameter before drying, and shrunk down to 0.8 mm overnight. After calcination, the diameter shrunk again to about 0.5 mm. As shown in Table 7, between 50 and 100 microspheres were measured to calculate average diameters, as well as the shrinkage compared to the wet and dry state after each step in the preparation process. The software ImageJ was used to measure the diameter of each sphere. To verify the diameters of less optimal batches (low MAX phase yield, 35° C. vs. 100° C. drying), fewer microspheres were used to confirm the diameters. A light microscope (Leica S9i) was used for each step as the observed microspheres were still large enough. The standard deviation of the wet diameter is assumed to stem from the microspheres being deformed, as they could not be separated and were pressed into the petri dish. Looking at the standard deviation of the dried spheres, that assumption appears valid, as the deviation is an entire order of magnitude smaller. The microspheres shrink by about 60% initially, followed by another 40% after the calcination step, or a total of about 75% as shown in Table 7. The observed shrinkage was uniform across all investigated microspheres, which is shown in Table 9.

TABLE 9

Comparison of diameters with respect to the drying temperature used. Higher drying temperature results in slightly smaller diameters only in the precursors, the final product achieves the same range of diameters.

| | "sphericalness" | | | | |
| --- | --- | --- | --- | --- | --- |
| | 5 mL CH | 10 mL CH | 15 mL CH | 20 mL CH | 40 mL CH |
| 2 g CH in 100 mL | yes | yes | yes | yes | yes |
| 3 g CH in 100 mL | yes | initial tailing | tailing | tailing | teardrop |
| 3.5 g CH in 100 mL | initial tailing | tailing | strings | N/A | N/A |

Porous Microspheres

Figure 9:
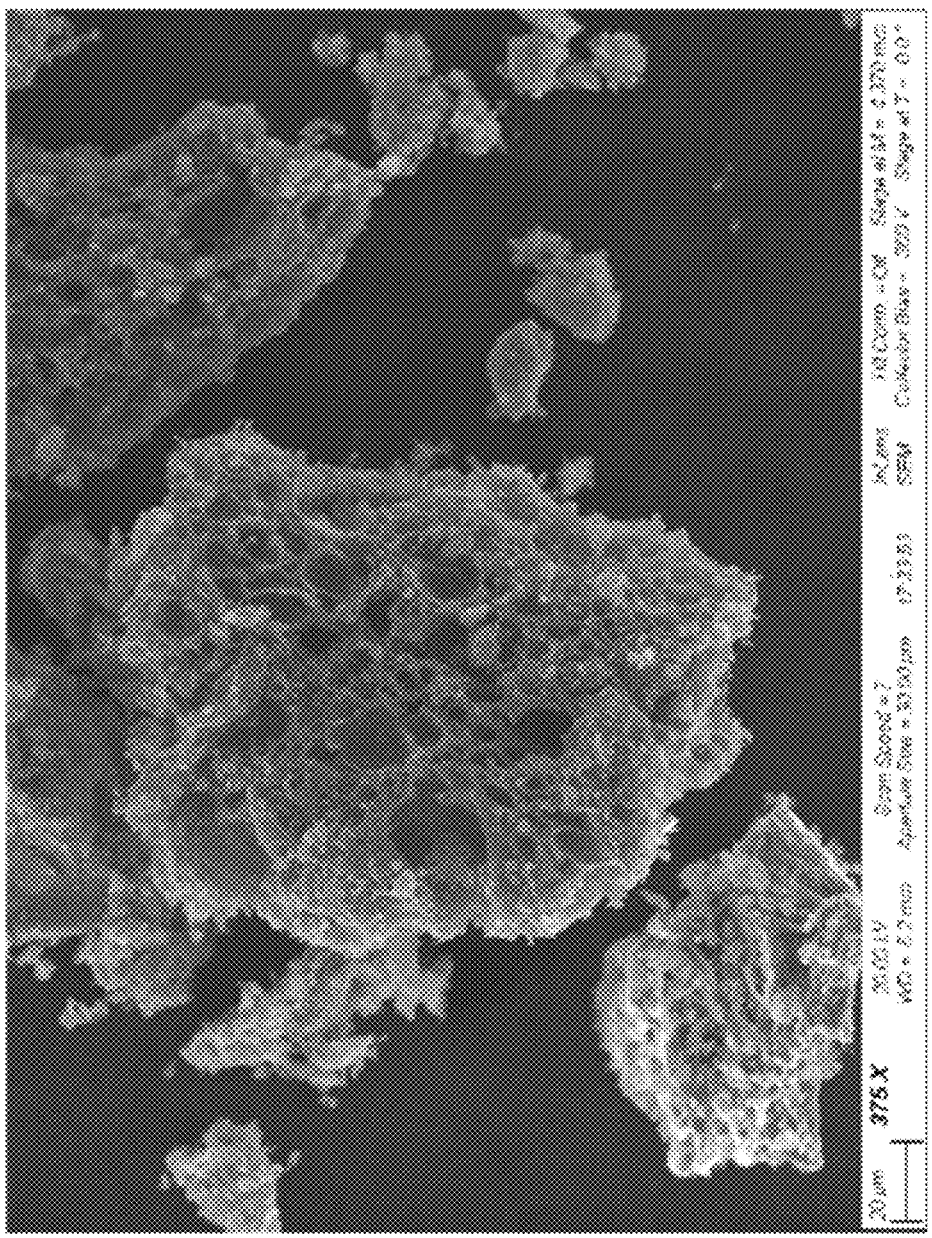
FIG. 9 shows an SEM image of a MAX phase $Cr_2GaC$ porous microsphere.

Porous microspheres were prepared by a different heating process than that used for nonporous microspheres. Using a microwave setup equipped with the option to insert an argon line into the reaction vessel, partially cracked or exploded microspheres were obtained. Additionally, the sphere interiors exhibited a high degree of porosity, while the surface was more disrupted and inhomogeneous. For the microwave reaction, the dried microsphere precursors (as prepared) were combusted in an alumina half-ampoule, which was inserted into a quartz half-ampoule. Inside the microwave an insulated housing made out of alumina fiber boards was used to contain the heat from the reaction. 7 g of activated charcoal was utilized as a susceptor to start the heating process. The charcoal was placed in an alumina beaker, into which the reaction vessel assembly was inserted. Before the reaction was started, the vessel was flushed with the aforementioned argon line (made from quartz glass) for 15 minutes, and was continuously flushed with argon throughout the reaction and cool down process. MAX phase $Cr_2GaC$ microspheres were obtained after 20 minutes at 700 W. FIG. 9 is an SEM image of a porous MAX phase microsphere.

Hollow Microspheres

Figure 10:
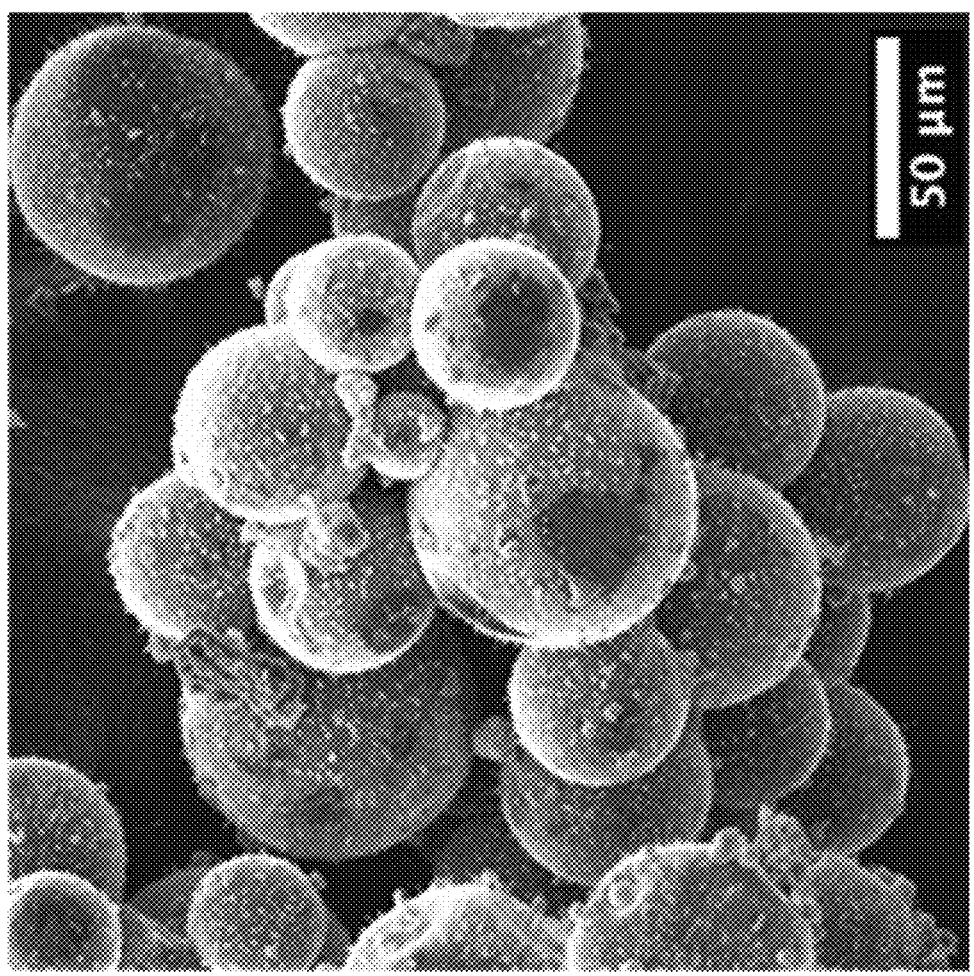
FIG. 10 is an overview SEM micrograph of post-calcination hollow MAX phase $Cr_2GaC$ microspheres.

A hollow microsphere template, carboxymethyl-dextran (Sigma Aldrich, CM-Sephadex®) was used to fabricate hollow microspheres. This compound, otherwise used as a cation exchanging agent in column chromatography, carries negative charges on its surface, making it effective in sequestering metal cations. These beads swell and form spherical gels when wet. Thus any cations present in solution will subsequently be soaked into the template, which has been shown to be viable for the formation of spherical oxides. Exploiting this behavior, hollow microspheres of MAX phase $Cr_2GaC$, shown in FIG. 10, can be synthesized. The template shrinks during the calcination process due to the decomposition of the polymer. Based on SEM, the pre-synthesis diameter ranges from about 30 μm to 100 μm, whereas the post-synthesis diameter shrinks to 10 μm-50 μm, which means the spheres shrink by about 55% (based on the pre- and post-synthesis median). The synthesis yields predominantly the target MAX phase, with about 91 wt-% $Cr_2GaC$ (based on Rietveld refinement of the XRD data), and $Cr_3C_2$ being the sole side phase.

Even though undetectable in the XRD data, the surfaces of the spheres carry Ga-rich segregations (mostly spherical), explaining the Cr:Ga ratio measured using EDS on the surface, which shows roughly 40 at-% Ga. Some of the Ga segregations appear to be Ga oxide. The surface morphology of the hollow microspheres differs significantly from the dense microspheres, in that the microspheres exhibit more consistency and no (EDS) identifiable segregations.

A typical synthesis involved a suspension of 100 mg CM-SEPHADEX in 10 mL DI water and 10 mL of a 0.05 M Cr/Ga solution (2:1 ratio), which were combined and stirred for 30 minutes. Next, the soaked microspheres were separated from the solution via filtration. A purple hue originating from Cr-nitrate was observed. The separated spheres were placed in an alumina crucible, and inserted in a tube furnace. Using the same combustion conditions as for the thick films, the desired MAX phase $Cr_2GaC$ was obtained in form of hollow microspheres.

Analysis of Products

SEM analysis was performed on a Zeiss Auriga FIB, equipped with a SDD EDS detector from Oxford instruments (Ultim MAX). All samples were mounted on an aluminum stub via adhesive carbon tape, and analyzed without any further preparation. The microscope was operated at acceleration voltages ranging between 5 and 20 keV.

All products were thoroughly structurally characterized by means of X-ray powder diffraction (XRD, Bruker D2 Phaser, $2^{nd}$ Generation) and Rietveld refinement method (Topas). Further characterization was carried out using optical (Leica S9i) and scanning electron microscopy (Zeiss Auriga), as well as energy dispersive X-ray spectroscopy (Oxford Instruments Ultim MAX).

Rietveld Refinement, Microwires

Structural refinements were performed using Topas and structure models from Inorganic Crystal Structure Database (ICSD). The refinement process started with the background polynomial (order: 10) and the sample displacement factor. For each identified phase, the lattice parameters and profile were alternately refined, until a $R_{wp}$ minimum was found. Atomic positions were subsequently refined. Lastly, thermal displacement factors (Beq) and occupancies were calculated, whereby only physically meaningful values were retained (≥and ≤1, respectively). For the profile, a modified Thompson-Cox-Hastings pseudo-Voigt function (pV-TCHZ) with the parameters u, v, w, and x was used.

Rietveld Refinement, Thick Films and Microspheres

Rietveld refinements were carried out in Topas, using crystal structures from ICSD. Generally, a sample displacement factor, scale factor, background, lattice parameters, profile, thermal displacement factors (Beq), occupancies, and phase compositions were refined. Typically, the refinement process started with establishing the background and displacement factor prior to fitting a crystal structure. The background polynomial was initially set to an order of 10. Next, the lattice parameters of the phase were alternatingly refined with the profile, whereas for the latter a modified Thompson-Cox-Hastings pseudo-Voigt function (pV-TCHZ) was used with the parameters u, v, w, and x. After obtaining the best possible fit with this procedure, atom positions were refined (in case of $Cr_2GaC$ only the z value of the Cr site), as well as thermal displacement factors and occupancies.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of making carbonaceous MAX phase structures, the method comprising:
   forming a gel comprising a transition metal M, a Group 3A or Group 4A metal or semimetal A, and an acidic chelating agent or gelling agent comprising X, wherein the chelating agent or gelling agent comprises a polysaccharide, and X comprises one or both of carbon and nitrogen;
   shaping the gel to yield a shaped gel; and
   heating the shaped gel to yield MAX phase structures with a composition represented by $M_{n+1}AX_n$, wherein n is 1, 2, 3, or 4.

2. The method of claim 1, wherein forming the gel comprises:
   dissolving a first salt or alkoxide comprising the transition metal M and a second salt or alkoxide comprising the Group 3A or Group 4A metal or semimetal A in a solvent to yield a sol; and
   combining the acidic chelating or gel forming agent with the sol to yield the gel.

3. The method of claim 1, wherein shaping the gel comprises:
   casting a portion of the gel into a mold;
   drying the portion to yield the shaped gel, wherein the shaped gel comprises a thick film precursor.

4. The method of claim 3, wherein heating the shaped gel comprises heating the thick film precursor to yield the MAX phase structures, wherein the MAX phase structures comprise a MAX phase thick film with a thickness in a range of 1 μm to 50 μm.

5. The method of claim 1, wherein shaping the gel comprises:
   dispensing the gel into an alkaline solution;
   precipitating the gel to yield precipitated structures;
   removing the precipitated structures from the alkaline solution; and drying the precipitated structures to yield the shaped gel, wherein the shaped gel comprises microsphere precursors.

6. The method of claim 5, wherein shaping the gel comprises heating the microsphere precursors to yield the MAX phase structures, wherein the MAX phase structures comprise MAX phase microspheres with a diameter in a range of 1 µm to 1000 µm or 500 µm to 700 µm.

7. The method of claim 1, wherein shaping the gel comprises forming a multiplicity of microwires from the gel, and heating the shaped gel yields a multiplicity of MAX phase microwires.

8. The method of claim 1, wherein shaping the gel comprises:
spreading the gel between a first substrate and a second substrate; and
separating the first substrate and the second substrate to yield the multiplicity of microwires.

9. The method of claim 1, wherein shaping the gel comprises spinning the gel to yield a multiplicity of microwires.

10. The method of claim 1, wherein the polysaccharide comprises a linear polysaccharide, and the MAX phase structures comprise thick films, microspheres, or microwires.

11. The method of claim 10, wherein the microspheres are porous.

12. The method of claim 10, wherein the linear polysaccharide comprises chitosan.

13. The method of claim 1, wherein the polysaccharide comprises a crosslinked polysaccharide, and the MAX phase structures comprise hollow microspheres.

14. The method of claim 13, wherein the crosslinked polysaccharide comprises dextran.

15. The method of claim 1, wherein M is chromium, A is gallium, and X is carbon or carbonitride.

16. A MAX phase structure comprising:
a microwire having a composition represented by $M_{n+1}AX_n$, wherein:
M is a transition metal,
A is a Group 3A or Group 4A metal or semimetal A,
X comprises one or both of carbon and nitrogen, and
n is 1, 2, 3, or 4.

17. The MAX phase structure of claim 16, wherein M is chromium, A is gallium, and X is carbon, nitrogen, or carbonitride.

18. The MAX phase structure of claim 16, wherein the microwire has a length in a range between about 1 mm and about 1 m.

19. The MAX phase structure of claim 16, wherein the microwire has a length of at least 1 meter.

20. The MAX phase structure of claim 16, wherein the microwire has a diameter in a range between 200 nm and 50 µm.

21. The MAX phase structure of claim 16, wherein the microwire is halogen-doped.

* * * * *